April 19, 1966      M. A. OLIVER, JR      3,246,587
COMBINATION RADIO AND CAMERA
Filed Sept. 3, 1963
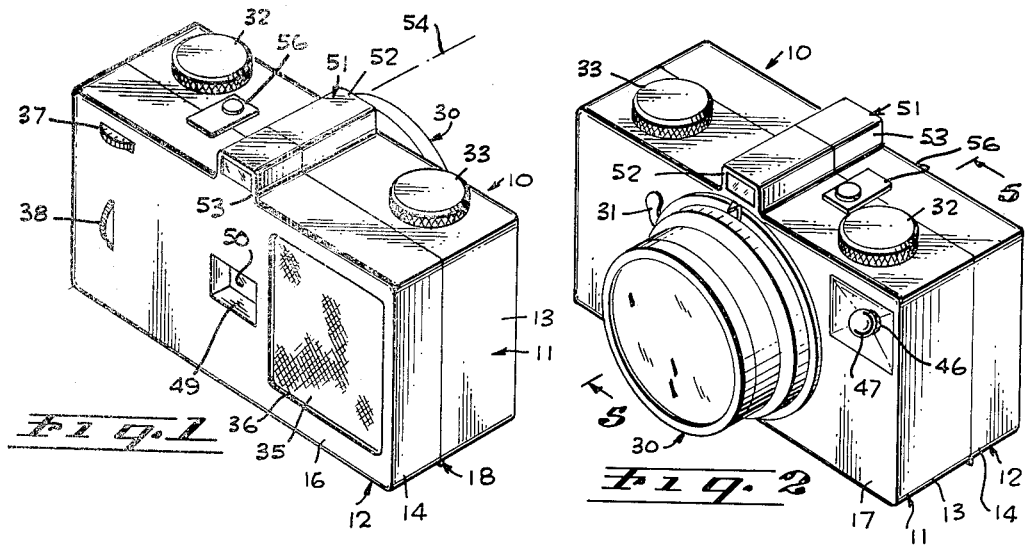
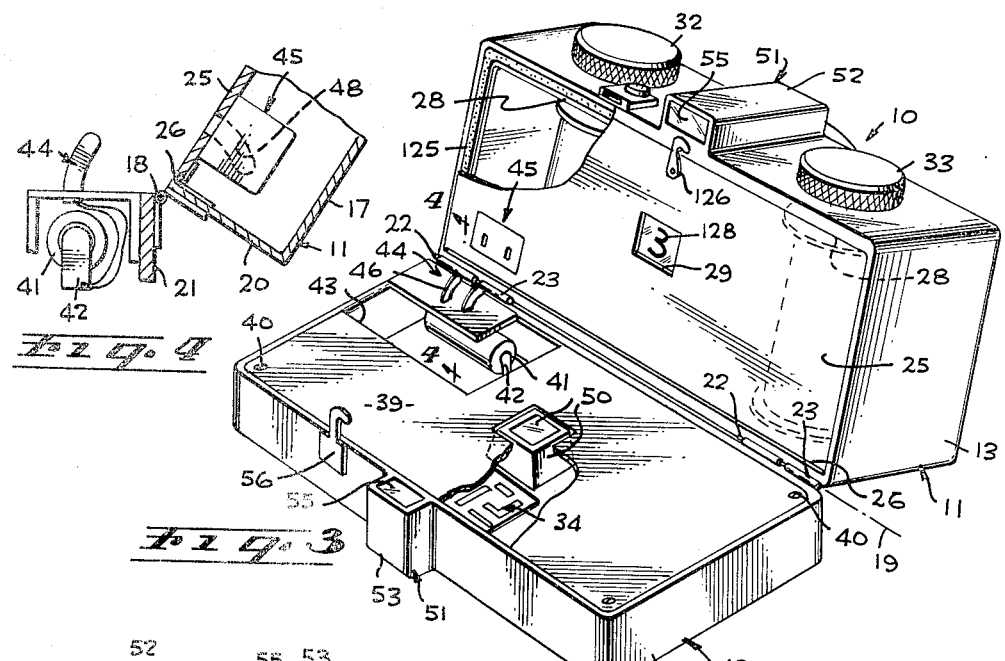
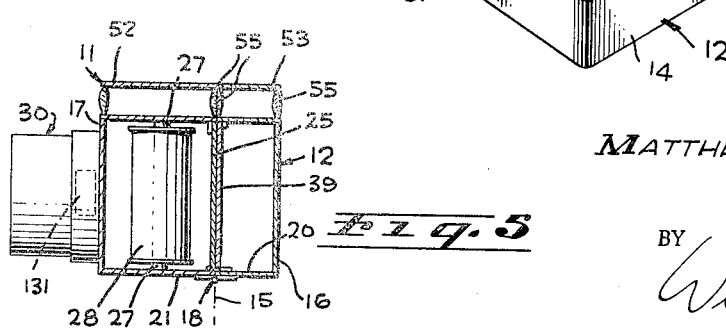
MATTHEW A. OLIVER, JR.
INVENTOR.
BY *William P. Green*
ATTORNEY United States Patent Office 3,246,587
Patented Apr. 19, 1966

3,246,587
COMBINATION RADIO AND CAMERA
Matthew A. Oliver, Jr., 3717 Kingridge Drive,
San Mateo, Calif.
Filed Sept. 3, 1963, Ser. No. 306,011
11 Claims. (Cl. 95—12)

This invention relates to an improved portable combination radio and camera.

There have in the past been devised certain dual purpose devices intended for the purpose of providing both camera and radio functions in a single unitary structure. However, these prior devices have not proven sufficiently practical to attain any substantial commercial usage or success.

The general object of the present invention is to provide an improved combination radio and camera unit in which the radio and camera portions are so interrelated and interconnected as to render the overall assembly considerably more practical than have been the above discussed prior expedients. Particularly contemplated is an assembly which is capable of being reduced to a minimum size, and can be very easily manipulated both as a radio and camera. Certain features of the invention relate to a housing arrangement which greatly facilitates access to the interior of both the camera and radio, to enable loading of film into the camera, and to enable replacement of batteries in the radio, or repair of the radio.

Structurally, the housing of a device embodying the invention preferably includes two housing sections, one of which contains the camera, while the other contains the radio. These housing sections are desirably secured together in a manner such that the back sides of the two sections are received essentially against one another, but with the sections being releasable to an open condition in which the back sides are accessible. The film may then be fed into the camera section of the housing when the two housing sections are opened, and the interior of the radio may also be rendered accessible by such relative opening movement of the two sections. This arrangement has the advantage of providing easy access to the working parts of the two units while at the same time avoiding interference by either unit with any portion of the other section.

The two housing sections are preferably secured together for their opening and closing movement by means of a hinge or hinges connecting the sections for relative swinging movement. In order to enable viewing of the numbers or other markings on a film contained in the camera, for facilitating setting of the film for successive pictures, I find it desirable that the radio portion of the device contain a window through which a viewer is able to see, entirely through the radio section, and into the camera section. Registering with this window there may be provided an opposed similar window formed in a light-tight back wall of the camera section of the device, with this second window containing red glass or plastic capable of preventing the admission of any light of a frequency to affect the film.

This light-tight back wall or back door of the camera section may be mounted for opening and closing movement so that it may protect the film in the camera against exposure to light when the two body sections are moved to their opened position, with the light-tight door then being openable relative to the camera section if desired, to allow insertion or removal of film. Preferably, the light-tight door is a hinged door.

Certain additional features of the invention relate to a unique arrangement for electrically connecting the battery of the radio to an electrically actuated portion of the camera, such as a flash bulb firing unit, to serve a dual energizing function. For this purpose, I find it desirable to employ automatic electrical connectors which are actuable between circuit closing and circuit opening conditions in response to relative opening and closing movement of the two housing sections.

Another feature of the invention has to do with an improved viewfinder arrangement, in which a composite viewfinder structure is formed of two separable portions, mounted on the two housing sections respectively, and adapted to move into and out of aligned active positions as a result of the relative opening and closing movement of the two housing sections.

The above and other features and objects of the invention will be better understood from the following detailed description of the typical embodiment illustrated in the accompanying drawing in which:

FIG. 1 is a perspective view of a combined camera and radio device embodying the invention, as viewed from the radio side of the unit;

FIG. 2 is a similar perspective view, but showing the camera side of the device;

FIG. 3 is a perspective view, partially broken away, showing the interior of the combined camera and radio as it appears in opened condition;

FIG. 4 is a fragmentary section taken on line 4—4 of FIG. 3; and

FIG. 5 is a fragmentary vertical section taken on line 5—5 of FIG. 2.

With reference first to FIGS. 1 and 2, the combined camera and radio is designated generally in those figures by the number 10, with the camera being represented at 11 and the radio at 12. The two housing sections 13 and 14, for the camera and radio respectively, are desirably of the illustrated essentially rectangular configuration, and are mounted in a back to back relation with their essentially planar back sides meeting in the transverse plane designated 15 in FIG. 5. The cross section of the two housing sections in planes disposed parallel to plane 15 may be uniform through the entire composite thickness of the two housing sections, from front wall 16 of the radio (FIG. 1) to front wall 17 of the camera. As will be apparent, these two walls 16 and 17 are desirably parallel to one another, with the top, bottom and side walls of the housings being perpendicular to walls 16 and 17. The housing sections are preferably formed of a suitable resinous plastic material, such as high impact polystyrene.

As seen best in FIG. 3, the two housing sections are secured together by hinges 18 for relative swinging movement between the open position of FIG. 3 and the closed position of FIGS. 1 and 2. The hinge axis 19 of hinges 18 is horizontal, in the illustrated orientation of the parts, and lies in vertical plane 15 of FIG. 5. As will be apparent from that figure, the two halves of each hinge may be secured to the bottom walls 20 and 21 of the two housing sections 13 and 14 respectively, and it is preferred that the hinge portions be of the separable type illustrated in FIG. 3, in which pins 22 carried by the radio section are movable axially out of the tubular hinge sleeves 23 carried by the camera section, to enable complete detachment of the camera from the radio if desired.

Housing section 13 of the camera may be closed at its rear side by a rectangular light-tight door 25, typically taking the form of a planar sheet of opaque resinous plastic material shaped to exactly fill the rectangular space at the rear of the camera housing. The door 25 may be hinged at its lower edge by a piano hinge 26 to bottom wall 20 of the camera housing, to swing between the full line closed position of FIG. 3 and the broken line open position. The door is preferably sealed in some convenient manner to be light-tight, as by provision of appropriate peripheral sealing material 125. A latch 126 is operable to releasably secure door 25 in its closed condition.

Within the interior of camera housing section 13, there are provided conventional film mounting elements or shafts 27, which act to removably mount a pair of film spools 28, so that the film may be held in proper position for exposure, and may be successively advanced through different settings for taking a series of pictures. The various proper settings of the film for the different pictures are indicated by markings 128 on the film which are visible through a viewing window 29 in door 25, with this viewing window containing glass or plastic of an essentially transparent character, but colored red to prevent the admission into the camera housing of any light capable of affecting the film. As seen best in FIG. 5, the door 25 may in its closed position be substantially flush with the edge surfaces of housing section 13.

When a picture is taken on the film, the image being photographed is focused on the film by conventional lens assembly 30 mounted on front wall 17 of the camera. Associated with this lens assembly there is provided a shutter mechanism actuable by an operating lever 31, to momentarily open the shutter and thereby impress the image on the film. Two knobs 32 and 33 are desirably carried at the top of the housing section 13, and are connected to the film mounting shafts or other elements 27 to advance the film as successive pictures are taken, and to ultimately rewind the film if desired.

The second housing section 14 contains a conventional transistor radio receiver whose interior circuitry is represented generally at 34 in FIG. 3. This circuitry includes a speaker which may be heard through a speaker grill 35 mounted within an opening 36 in the forward wall 16 of the radio housing section (see FIG. 1). The receiver is controlled in the usual manner by a tuning element 37 and an on-off and volume control element 38, both accessible for actuation when the housing is in its closed condition of FIGS. 1 and 2. The back side of the radio housing may be closed by a planar back wall 39 (FIG. 3) which like the other housing parts may be formed of a suitable electrically insulative resinous plastic material. Wall 39 may be secured in its illustrated position by screws 40, which connect into suitable bosses formed by the main housing section 14, and which are detachable to allow removal of wall 39 for repair of the radio circuit. As in the case of door 25, wall 39 may be flush with the edges of the housing walls within which it is received, and may meet door 25 at plane 15 of FIG. 5.

The battery 41 for energizing the radio may be removably received between a pair of spring contacts 42, with a corner portion of wall 39 being open at 43 to allow insertion and removal of a battery without removal of wall 39. In addition to being connected to the receiver, battery 41 is also connected through a two prong plug 44 and mating two socket receptacle 45 to the socket 46 (FIG. 2) within which a flash bulb 47 is removably mounted at the front of the camera. The plug 44 and socket 45 are so designed as to automatically detach these parts, and break the electrical connection to the flash bulb socket, when the two housing sections 13 and 14 are swung relatively to their open positions of FIG. 3. For this purpose, the prongs 46 of plug 44 may be rigidly mounted to an electrically insulative bracket 47 secured to one of the walls of housing section 14, and may be curved as illustrated in FIG. 4, essentially about the axis 19 of main hinges 18, to be slidably receivable within correspondingly curved contacts 48 of socket 45. The socket structure may be secured to door 25, being received within an opening in that door, and being designed to effectively maintain the light-tight integrity of the door at the contact location. As will be apparent, the two contacts 46 of the plug are connected to battery terminals 42 respectively and the two contacts 48 of the socket structure are connected to opposite sides respectively of the flash bulb receiving socket 46, preferably through a conventional synchronizing switch 131 which is closed momentarily upon actuation of the shutter mechanism.

In addition to opening 36 and the openings for controls 37 and 38, front wall 16 of the radio contains another typically central opening 49 (FIG. 1), within which there is mounted a window structure 50 (FIG. 3), which may reduce slightly in cross section as it advances inwardly of the housing, to terminate closely adjacent and in registry with window 29 in door 25. An apppropriate glass or transparent plastic window element proper may be mounted within the window frame structure, so that a user may view one of the markings 28 from the radio side of the overall unit, and through windows 50 and 29, when the housing is closed.

The viewfinder 51 through which a user views the scene to be photographed by the camera, is formed of two sections 52 and 53 carried by the two housing sections 13 and 14 respectively. In the closed condition of the housing, these two sections or portions 52 and 53 are aligned with one another, as seen in FIGS. 1 and 2, to form a composite tunnel or passage whose axis 54 is generally parallel to the axis of the main lens assembly. Viewer sections 52 and 53 may be formed integrally with the rest of the housing sections, by merely being molded as a part of the housing elements. Each of the view finder portions 52 and 53 may contain one or more lens elements 55, with these lens elements being constructed to form together an appropriate image having a proper relationship to the lens image, so that the viewer sees the picture which is to be taken. The adjacent ends of viewfinder portions 52 and 53 meet at the previously discussed main central plane 15.

The entire device is retained in its closed condition by an appropriate latching or locking assembly 56 (FIG. 1 and 2), including latch elements carried by the two housing sections 13 and 14 respectively at their upper edges, to prevent relative opening movement of the housing sections.

To now describe the manner of use of the illustrated device, the film may first be loaded into the camera portion of the device by releasing latch 56, relatively opening the two housing sections to their FIG. 3 condition, then releasing lock 26 and opening rear light-tight door 25 of the camera, to enable a roll of film to be inserted into retained engagement with the conventional film holders typically represented at 28. The door 25 may then be closed and latched, and the two housing sections 13 and 14 may be swung about their hinges 18 to closed condition, and retained in their closed condition by lock 56. The user then turns one of the knobs 32 and 33 to advance the film until the number "1" appears through aligned windows 50 and 29, to indicate that the film is in position for taking a first picture. Next, the user makes any necessary adjustments to the lens, and holds the camera in a position in which the desired scene is visible through viewfinder 51, at which time shutter element 31 is actuated to take the picture. The film may then be advanced again to take the next successive picture, etc. If a flash picture is to be taken, a bulb is inserted within socket 46, and is automatically energized by current fed from battery 41 through plug and socket connection 44–45, with the flash synchronizing switch 131 automatically closing the circuit to the flash bulb at essentially the instant that the shutter is opened.

The radio is of course used in conventional manner, and needs no further discussion.

I claim:

1. The combination comprising a first hollow housing section, a second hollow housing section, said sections having back sides which are receivable essentially against one another in a predetermined closed position of the housing sections and are movable away from one another to an open position providing access to said back sides, camera means carried by said first housing section and including means for holding a film in the first section, means for focusing an image on said film, shutter means, and means for actuating said camera means when said housing sections are in said closed position, a radio receiver in said second housing section, and means for actuating said receiver when said sections are in said closed position, means forming a window at said back side of the firse section for viewing markings on said film indicating the setting thereof, a registering window in said second housing section located to enable viewing of said markings through said second section when the sections are in said closed position, and means for releasably securing said sections in said closed position.

2. The combination comprising a first hollow housing section, a second hollow housing section, said sections having back sides which are receivable essentially against one another in a predetermined closed position of the housing sections and are movable away from one another to an open position providing access to said back sides, camera means carried by said first housing section and including means for holding a film in the first section, means for focusing an image on said film shutter means, and means for actuating said camera means when said housing sections are in said closed position, a radio receiver in said second housing section, means for actuating said receiver when said sections are in said closed position, and means forming a window in said second section through which a user may view markings on the film in said first section when the sections are in closed position to indicate the setting of the film.

3. The combination comprising a first hollow housing section, a second hollow housing section, said sections having back sides which are receivable essentially against one another in a predetermined closed position of the housing sections and are movable away from one another to an open position providing access to said back sides, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, means for releasably securing said sections in said closed position, a light-tight door closing said back side of said first housing section and mounted for opening and closing movement relative thereto when and only when said two sections are in their relative open positions, means forming a window through said light-tight door for viewing markings on said film indicating the setting thereof, and a registering window in said second housing section located to enable viewing of said first window and said markings therethrough and through said second section when the sections are in said closed position.

4. The combination comprising a first hollow housing section, a second hollow housing section, said sections having back sides which are receivable essentially against one another in a predetermined closed position of the housing sections and are movable away from one another to an open position providing access to said back sides, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, means for releasably securing said sections in said closed position, a light-tight door closing said back side of said first housing section and mounted for opening and closing movement relative thereto when and only when said two sections are in their relative open positions, means forming a window through said light-tight door for viewing markings on said film indicating the setting thereof, a registering window in said second housing section located to enable viewing of said first window and said markings therethrough and through said second section when the sections are in said closed position, and hinge means extending essentially along an edge of said back sides and mounting said door to said first housing section for opening and closing swinging movement relative thereto.

5. The combination comprising a first hollow housing section, a second hollow housing section, said sections having back sides which are received essentially against one another in a predetermined closed position of the housing sections and are movable away from one another to an open position providing access to said back sides, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, there being a space for receiving a battery in said second housing section, means for connecting said battery to said receiver, said camera means including electrically energized means, and interfitting electrical connector elements carried by said two housing sections respectively and automatically movable into and out of current conducting engagement upon relative movement of the sections to said closed and open positions respectively.

6. The combination as recited in claim 5, in which said electrically energized means include means for firing a photographic flash bulb.

7. The combination comprising a first hollow housing section, a second hollow housing section, said sections having back sides which are receivable essentially against one another in a predetermined closed position of the housing sections and are movable away from one another to an open position providing access to said back sides, hinge means interconnecting said two housing sections at essentially one edge of said back sides for relative swinging movement between said open and closed positions, camera means carried by said first housing section and including means for holding a film in the first section, means for focusing an image on said film, shutter means, and means for actuating said camera means when said housing sections are in said closed position, a raido receiver in said second housing section, means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, means for releasably securing said sections in said closed position, there being a space for receiving a battery in said second housing section, means for connecting said battery to said receiver, electrically energized flash bulb firing means carried by said first housing section, a plug element and a socket element detachably interconnectible to conduct current from said battery to said firing means, and means mounting one of said elements to said first housing section and the other to said second housing section in a relation to connect and disconnect the elements in response to closing and opening movement of said housing sections.

8. The combination comprising a first hollow housing section, a second hollow housing section, said sections having back sides which are receivable essentially against one another in a predetermined closed position of the housing sections and are movable away from one another to an open position providing access to said back sides, camera means carried by said first housing section and including means for holding a film in the first section, means for focusing an image on said film, shutter means, and means for actuating said camera means when said housing sections are in said closed position, a radio receiver in said second housing section, and means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, and means for releasably securing said sections in said closed position, a light-tight door closing said back side of said first housing section, hinge means mounting said door to said first housing section for opening and closing movement relative thereto, to allow loading and unloading of film, when and when when said two sections are in their relative open positions, there being a space for receiving a battery in said second housing section, means for connecting said battery to said receiver, electrically energized flash firing means carried by said first housing section, a plug element and a socket element detachably interconnectable to conduct current from said battery to said firing means, one of said elements being received within an opening in said door to conduct current therethrough, and means mounting said two elements for movement with said two housing sections in a relation to automatically close the current to said firing means upon relative closure of the sections.

9. The combination comprising a first hollow housing section, a second hollow housing section, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, and a viewfinder for viewing the image to be photographed on said film and including two separable portions of the viewfinder carried by said two housing sections respectively for movement therewith between aligned viewing positions, in said closed position of the sections, and separated non-viewing positions when the sections are open.

10. The combination comprising a first hollow housing section, a second hollow housing section, said sections having back sides which are receivable essentially against one another in a predetermined closed position of the housing sections and are movable away from one another to an open position providing access to said back sides, hinge means interconnecting said two housing sections at essentially one edge of said back sides for relative swinging movement between said open and closed positions, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, means for releasably securing said sections in said closed position, and a viewfinder for viewing the image to be photographed on said film and including two separable portions of the viewfinder carried by said two housing sections respectively at edges thereof which are opposite the edge at which said hinge means are located, and in a relation such that said viewfinder portions are optically aligned when said housing sections are closed, but are separated from one another and not aligned when the housing sections are open, and lock means for securing said housing sections in closed position.

11. The combination comprising a first hollow housing section, a second hollow housing section, said sections having back sides which are receivable essentially against one another in a predetermined closed position of the housing sections and are movable away from one another to an open position providing access to said back sides, hinge means interconnecting said two housing sections at essentially one edge of said back sides for relative swinging movement between said open and closed positions, camera means carried by said first housing section and including means for holding a film in the first section, means for focusing an image on said film, shutter means, and means for actuating said camera means when said housing sections are in said closed position, a radio receiver in said second housing section, means for actuating said receiver when said sections are in said closed position, said film holding means being positioned for access, to load and unload film, through said back side of said first section when the sections are in said open position but not in said closed position, said radio receiver being positioned for access through said back side of said second housing section when said sections are in said open position, means for releasably securing said sections in said closed position, a light-tight door closing said back side of said first housing section, second hinge means mounting said door to said first housing section for opening and closing movement relative thereto, to allow loading and unloading of film, when and only when said two sections are in their relative open positions, means forming a window through said light-tight door for viewing markings on said film indicating the setting thereof, a registering window in said second housing section located to enable viewing of said first window and said markings therethrough and through said second section when the sections are in said closed position, said second housing section being constructed to hold a battery connectible to the receiver, electrically energized flash firing means carried by said first housing section, a plug element and a socket element detachably interconnectible to conductor current from said battery to said firing means, one of said elements being received within an opening in said door to conduct current therethrough, means mounting said two elements for movement with said two housing sections in a relation to automatically close the current to said firing means upon relative closure of the sections, and a viewfinder for viewing the image to be photographed on said film and including two separable portions of the viewfinder carried by said two housing sections respectively for movement therewith between aligned viewing positions, in said closed position of the sections, and separated non-viewing positions when the sections are open.

References Cited by the Examiner
UNITED STATES PATENTS 2,858,751   11/1958   Lopez   95—12 X
2,868,098   1/1959   Lopez   95—12 X JOHN M. HORAN, *Primary Examiner.*